US006286836B1

(12) United States Patent
Hyllberg

(10) Patent No.: US 6,286,836 B1
(45) Date of Patent: Sep. 11, 2001

(54) SEALED CHARGING PORT AND METHOD OF CHARGING FOR A HEAT PIPE ROLLER

(75) Inventor: Bruce E. Hyllberg, Gurnee, IL (US)

(73) Assignee: American Roller Company, Union Grove, WI (US)

( * ) Notice: Subject to any disclaimer, the term of this patent is extended or adjusted under 35 U.S.C. 154(b) by 0 days.

(21) Appl. No.: 09/243,043

(22) Filed: Feb. 2, 1999

(51) Int. Cl.[7] ................................ F16L 21/04; F28F 5/02

(52) U.S. Cl. .......................... 277/314; 277/616; 277/622; 277/626; 492/46

(58) Field of Search ..................................... 277/616, 621, 277/622, 626, 628, 630, 641, 644, 314; 492/20, 46

(56) References Cited

U.S. PATENT DOCUMENTS

| | | | | |
|---|---|---|---|---|
| 2,074,591 | * | 3/1937 | Rood | 103/225 |
| 2,154,331 | * | 4/1939 | Hathcock | 103/225 |
| 2,941,475 | * | 6/1960 | Blair | 103/10 |
| 4,807,514 | * | 2/1989 | Gartzmuller | 92/25 |
| 5,145,008 | * | 9/1992 | Yun | 277/152 |
| 5,292,298 | | 3/1994 | Scannell | 492/46 |
| 5,529,313 | * | 6/1996 | Malks | 277/235 |
| 5,653,479 | * | 8/1997 | Henderson | 277/100 |
| 5,821,499 | * | 10/1998 | Crimmins et al. | 219/471 |
| 5,823,091 | * | 10/1998 | Collingborn | 92/59 |

OTHER PUBLICATIONS

U.S. application No. 08/783,597, Hyllberg et al., filed Jan. 13, 1997.

* cited by examiner

*Primary Examiner*—Chuck Y. Mah
*Assistant Examiner*—Vishal Patel
(74) *Attorney, Agent, or Firm*—Quarles & Brady LLP

(57) ABSTRACT

A roller (10) incorporating a heat pipe cavity (12) has a port (25) through which a medium (29) is flowed and a vacuum is drawn. The port (25) is sealed by a plug (20) which is lodged in a hole (14) by advance of a screw (16) against the plug (20) to form a metal-to-metal seal that will withstand pressures in the heat pipe cavity (12). A body of grease (21) is one of several ways disclosed for centering the plug (20) in the hole (14). The screw (20) can be advanced with a conventional Allen wrench or a special tool (35) having a driver head (22) on a shaft (23) that extends through a casing (24) for conveying medium or drawing a vacuum. The screw (16) has vents (28) to allow a vacuum to be drawn as the port (25) is sealed. A method of sealing is also disclosed.

20 Claims, 3 Drawing Sheets

SEALED CHARGING PORT AND METHOD OF CHARGING FOR A HEAT PIPE ROLLER

TECHNICAL FIELD

The invention relates to sealing of an entry port for rollers for use in a variety of industrial machines.

DESCRIPTION OF THE BACKGROUND ART

Steam-heated and induction-heated rollers are used in the paper making, printing, paper, film, and foil converting industries. Some examples are: web heating rollers, drying rollers and drums, laminating rollers, embossing rollers, and cast film extrusion rollers.

Steam-heated rollers are actually pressure vessels, especially at higher temperatures. The internal construction of both steam-heated and induction-heated cores can be quite complex and expensive in order to provide the temperature uniformity needed. In addition, a considerable amount of auxiliary equipment is needed to power or heat the roller.

Heat pipe technology has been used to control heat in various kinds of equipment used in space, remote monitoring stations and wherever heat transfer is required. A basic industrial heat pipe roller is disclosed in Noren, U.S. Pat. No. 3,700,028. As reported in Noren, "How Heat Pipes Work," *Chemical Engineering*, Aug. 19, 1974, acceptance of heat pipes in industry has been slow. Since that time a number of heat pipe constructions have been patented, often for small rollers used in office copiers and printers. Progress has remained slow, however, for industrial and large equipment applications.

International Publication Nr. WO 98/31194, published Jul. 16, 1998, discloses a heat pipe roller having an annular cavity between an inner cylindrical core and an outer cylindrical shell. To allow evacuation of the cavity and injection of an evaporative medium into the cavity, a charging port with a threaded plug is provided in one end of the roller. In the prior art, brazing or solder was used to seal the port after evacuation of air from the cavity and flowing of the medium into the cavity.

Prior art heat pipes are also of the gun-drilled type, in which one or more elongated heat pipe tubes are inserted in longitudinally extending gun-drilled holes in a roller core.

A primary cause of failure in heat pipes is the formation of non-condensable gases. Only one percent air or other gas in the heat pipe reduces heat pipe efficiency approximately fifty percent. Non-condensable gases can form as a result of corrosion, contamination, loss of vacuum, reaction of the medium with wicking materials, or degradation of the medium.

The maintenance of the seal on a charging port is important in preventing non-condensable gases. Such a seal should be easily assembled, and yet withstand internal pressures experienced by the heat pipe. The seal must be compatible with a charging sequence in which the heat pipe cavity is evacuated of air, the medium is flowed into the cavity and the port is sealed.

SUMMARY OF THE INVENTION

The invention is incorporated in a seal assembly and a method of sealing an entry port to a heat pipe.

The port is sealed with a metal-to-metal seal in which a plug is forced into a hole by torquing a screw behind the plug. The plug is made of a softer metal than the metal forming a hole in which the plug is received. The material forming the hole forms a circular, substantially sharp edge, either at 90° or slightly chamfered, without chips, burrs or other irregularities.

The plug is made of a metal that is approximately 30% softer than the metal forming the hole, so that the plug deforms and not the hole. On the other hand, if the plug material is too soft, the seal will relax over time. Brass, copper and nickel plugs are preferred for use with a hole formed in steel.

The screw has one or more longitudinally extending vents to allow a vacuum to be drawn from the heat pipe cavity as the seal is being applied.

The invention can be applied to a roller heated by hot oil, steam, hot water, electricity or to rollers that are cooled by water or other media, and is particularly useful where heat is to be transferred to or from a moving web of material.

The invention allows a heat pipe roller to be charged in the horizontal position. The invention allows reuse of the heat pipe roller. It also allows recharging in the field.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENTS

Figure 1:
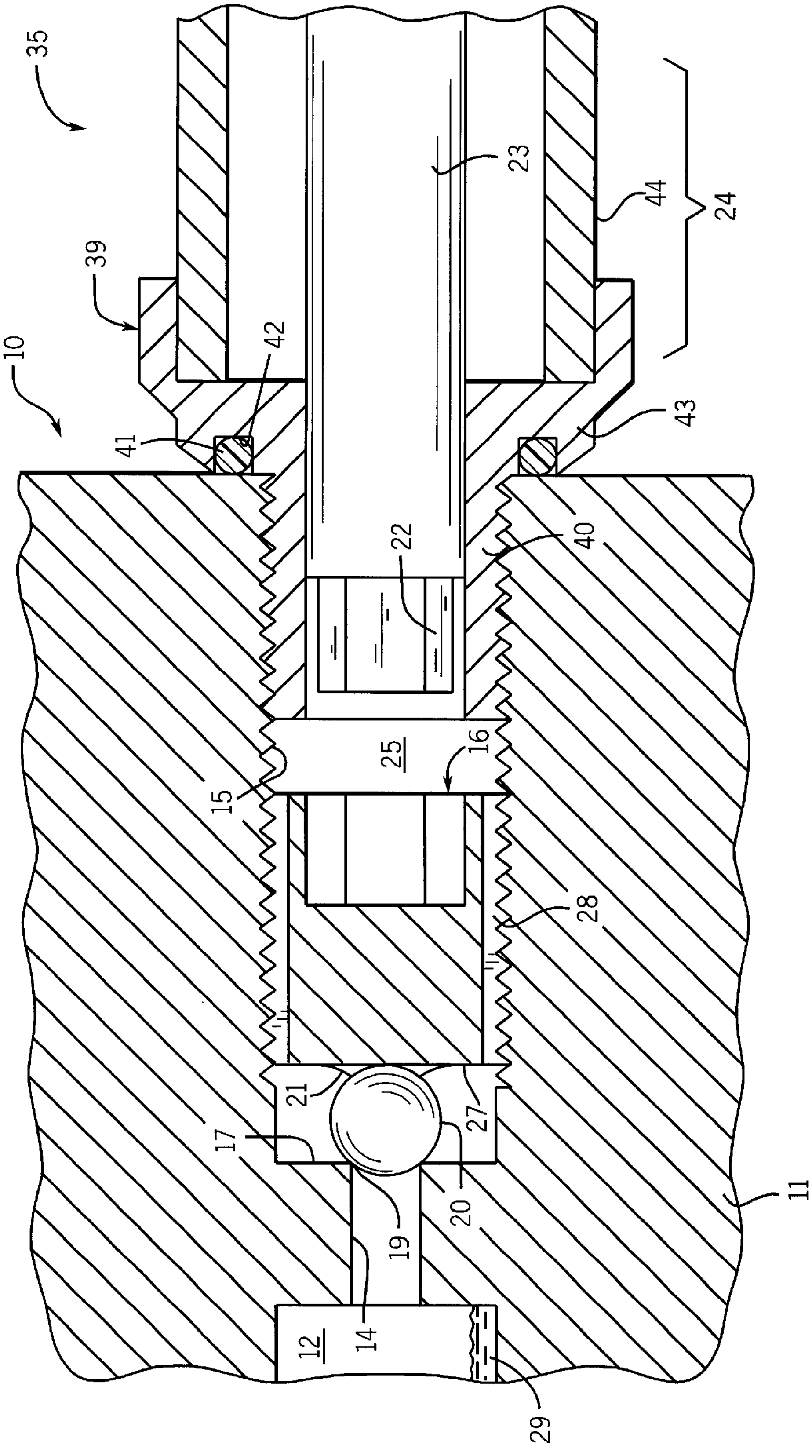
FIG. 1 a fragmentary sectional view of a sealed port of a heat pipe roller which illustrates the assembly of the present invention.

Referring to FIG. 1, a portion of roller 10 incorporating a heat pipe cavity 12 is shown. International Pub. Nr. WO 98/31194, published Jul. 16, 1998, describes a heat pipe roller which provides the environment for the present invention, and the description of such a roller is incorporated herein by reference.

In a portion of interest shown in FIG. 1, the roller 10 has an inner steel core 11, an outer shell (not shown in FIG. 1) and an annular heat pipe cavity 12 in between the core 11 and the shell. In one end of the core 11, an entry port 25, which forms part of the seal assembly of the invention, includes a hole 14, ⅛-inch in diameter, which is drilled from the exterior into the heat pipe cavity 12. Using the hole 14, as a centering guide, a larger tapped hole 15 is drilled to a lesser depth to accept a ⅜-20 threaded, sockethead screw 16. The larger hole is drilled with a bit that leaves a flat bottom 17 in the hole 15, but which also leaves a small chamfer around the rim 19. In this embodiment, the entry port 25 is formed in a wall of a steel roller core 11, but in other embodiments it might be formed in the shell or between the core 11 and the shell. In still other embodiments, the heat pipes may be inserted in gun-drilled holes extending longitudinally in the roller core 11.

Figure 2:
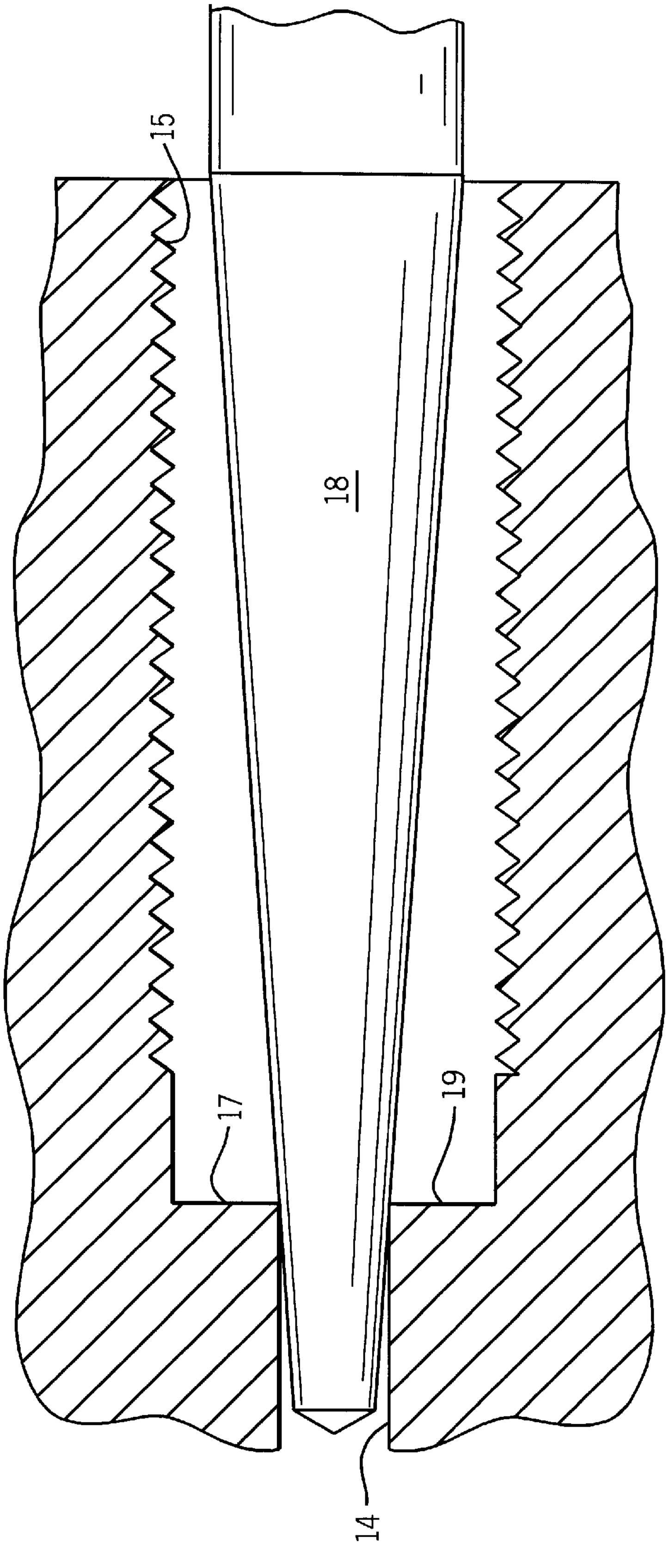
FIG. 2 is a fragmentary sectional view of the embodiment of FIG. 1 further showing a tool for shaping a portion of the sealing port.

A tapered, hardened punch 18 is then placed in the smaller hole 14 (FIG. 2) and given several light taps to reform the rim 19 around the entrance to the hole 14. A suitable punch is provided by a 3⁄32 point, 5⁄16-inch shaft, Nr. 3420 A2 from McMaster Carr. This step reshapes the hole entrance to a circle. It also removes any burrs or irregularities around the entrance to the hole 14. It also removes any chamfer left by the drill bit for the larger threaded hole 15 and it gives a uniform, substantially sharp edge to the rim 19.

The next part of the seal assembly is a metal plug 20, preferably a ball made of brass, but alternatively may be made of copper, nickel or other, soft metals. In this example, the is 3⁄16 inch in diameter, which is a preferred size for the 1⁄8 inch entry hole 14 (1.5 times the diameter of the entry hole 14). Other shapes of plugs are possible, including cone-shaped or bullet-shaped, but a ball is preferred. Behind the ball 20 is a headless 3⁄8-20 Allen-type socket-head screw 16, which is inserted into hole 15. Prior to insertion, a small amount of silicone grease 21 is placed in the center of the end face of the screw 16 and the ball is placed in the grease 21. The grease 21 allows the screw 16 to slide on the surface of the ball 20, without turning the ball 20 until the ball 20 moves far enough forward to seal the hole 14. The screw typically has a flat end face 27 facing the hole 14, but the face 27 can also have other surface shapes.

The screw 16 is advanced in the hole 15 with a tool, either a standard Allen wrench or the tool 35 shown in FIG. 1, which includes a head 22 on the end of a shaft 23, which extends through a casing 24 for applying vacuum pressure or flowing liquid into the port 25. To form the seal, torque is applied to the screw 16 to force the ball 20 into position in the hole 14, and then the screw 16 is turned from 1⁄4 to 3⁄4 turn to push the ball into the hole 14 to a depth of ten to sixty mils to form the seal. A seal can be formed with at little as 1⁄8 turn and will still form up to at least one full turn.

Once the ball 20 is lodged in the hole 14, it will withstand 1000 psi at 600° F. without being forced out of the hole 14. Even a quarter turn of the screw 16 after contact with the hole 14 is made, will cause the ball 20 to become lodged in the hole 14. The ball 20 can also be 1⁄4 inch in diameter or 5⁄16 inch in diameter for the 3⁄8 inch tapped hole 15 and 1⁄8 inch entry hole 14, but more force is required to seal a larger ball 20 in the hole 14. While the preferred size of the hole 14 is 1⁄8 inch, other sizes as small as 1⁄16 inch or as large as 1⁄2 inch in diameter are possible.

About 30 pound-inches of torque is required to turn the screw the last 1⁄4 turn (with a 1⁄8 inch diameter hole and a 3⁄16 inch ball). More torque is required to turn the ball 1⁄2 turn or further. The 1⁄4 turn results in a force of approximately 400 pounds of force against the ball. Due to the small area of contact between the ball 20 and the edge of the hole 14, the sealing force is estimated to be in excess of 100,000 psi. In operation, the heat pipe pressure will normally be in the 14.7 to 680 psi range for roller temperatures of 212 to 500° F., when water is used as the heat pipe medium. The area of sealing provides a ring impression in the ball 20 having a line width from approximately ten mils to sixty mils. The screw 16 has air passages in the form of longitudinal slots 28 seen in FIG. 1. These are provided for allowing the drawing of a vacuum as the port 25 is being sealed. The slots 28 extend through the threads, but could also be located in the body of the screw 16.

Figure 3:
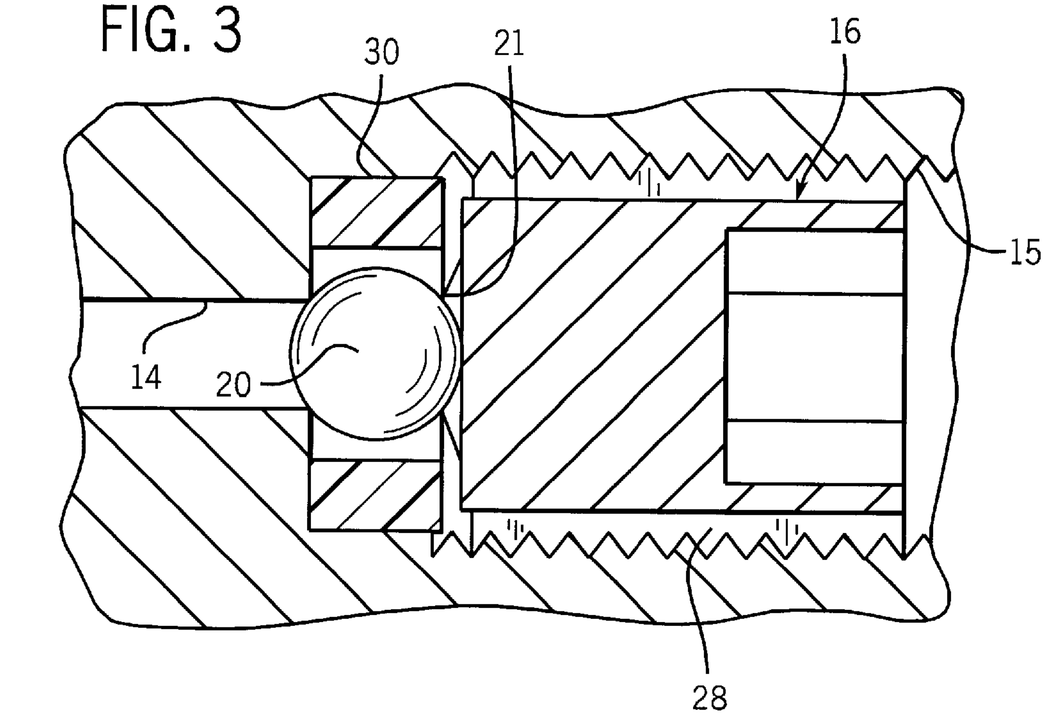
FIGS. 3 and 4 are fragmentary sectional views of alternative embodiments of the invention of FIG. 1.
Figure 4:
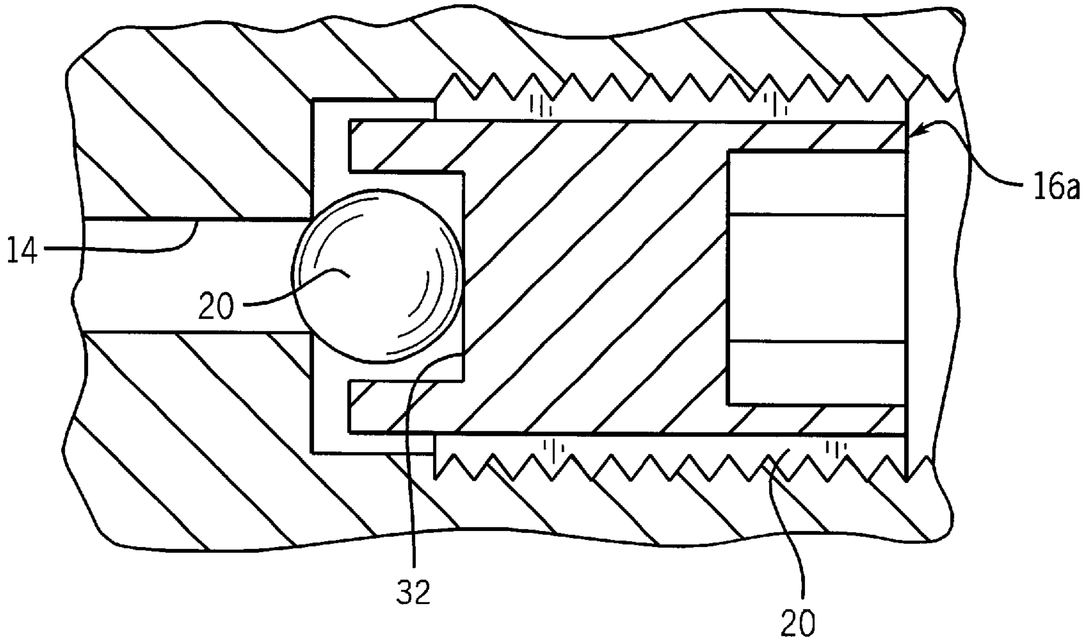

Other embodiments for centering the ball 20 are illustrated in FIGS. 3 and 4. In FIG. 3, a plastic or metal ring 30 and the body of silicone grease 21 are used to center the ball 20 as the screw 16 is advanced against the ball 20. In FIG. 4, the front end of a screw 16
a depression 32 for holding the ball 20 centered along the axis of the screw 16. The shape of the depression 32 can be cylindrical, hemispherical or conical.

The operating pressure of the heat pipe is determined by the media and operating temperature. The heat pipe cavity 12 is provided with some type of over pressure device (not shown), such as a pressure relief valve or preferably a pressure-rupture disk.

The medium 29 (FIG. 1) for flowing into the heat pipe cavity 12 can be any material that is thermally stable, noncorrosive, and can exist both as a liquid and a gas in the temperature range in which the heat pipe will be used. For best operation, the atmospheric boiling point of the medium is slightly below the operating temperature of the heat pipe. Water boils at 100° C. (212° F.) and functions best as a medium above this temperature. But because there is a vacuum in the heat pipe (the only pressure is due to water vapor), water still works at temperatures below 65.5° C. (150° F.). A heat pipe can work efficiently well above the atmospheric boiling point and can also work reasonably well at low pressure. A low operating pressure allows the outer shell of the roller 10 to be relatively thin. At 260° C. (500° F.), water has a vapor pressure of 47.804 $kg/cm.^2$ (680 psi) making it less desirable as the heat-conducting medium 29 except in rollers with very strong, thick walls around the heat pipe cavity 12. Dowtherm A, a synthetic heat transfer fluid, would be preferred for operation at higher temperatures, such as 260° C. (500° F.) or above, because it would produce an operating pressure of only about 1.054 $kg/cm.^2$(15 psi). This allows the outer shell wall to be relatively thin.

Before charging the heat pipe cavity 12 with a new quantity of medium 29, the roller 10 can be heated to a high temperature under vacuum to remove adsorbed gases. The roller 10 is then cooled. The medium in an external container must also be exposed to vacuum to draw off trapped gases before flowing medium 29 into the heat pipe cavity 12. A special tool 35, the head end of which is seen in FIG. 1 has a Allenhead driver 22 on one end of a shaft 23 that extends through casing 24. The tool 35 includes a fitting 39 with a threaded tube 40 that can be screwed into the hole 15. An O-ring 41 is carried in a groove 42 in a collar portion 43 of the fitting 39. The collar 39 forms a circular opening facing away from the port 25, and this opening receives another tubular portion 44 of the casing 24 of the tool 35. The casing 24 has inlets (not shown) for a source of vacuum (negative) pressure and for a source of heated liquid medium. Shut off valves are provided to control application of the vacuum and flow of the fluid into casing 24. The head 22 on the end of the tool can be used to retract the screw 16 beyond the source of the vacuum so that the holes 14, 15 are unblocked and flow is unrestricted. A source of heated medium is then used to flow medium 29 through the holes 14, 15 into the heat pipe cavity 12. The tool 22,23 is then used to advance the screw 16 behind the ball 20, using the grease 21 as shown in FIG. 1, until the ball 20 contacts the rim 19. The shaft 23 is rotated one quarter to three quarters of a turn and then withdrawn. A plug or second screw (not shown) can then be inserted in the open end of the hole 15 and brazed or otherwise fixed in place to seal the hole 15 and protect the screw 16 from being disturbed.

This method has the advantage over current methods in that the introduction of medium, the drawing of vacuum and the sealing of the port 25 can be performed with the roller 10 a horizontal position, and this can be done in the field as well as at the factory. With the methods and apparatus of the invention, the roller 10 can be recharged through the port 25 many times. When the heat pipe is to be recharged, the ball 20 can be pried out of the hole 14 using a small screwdriver.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

What is claimed is:

1. Apparatus for sealing a port in a heat pipe for a roller, the apparatus comprising:

a wall portion of the heat pipe, said wall portion being made of metal and having an entry hole communicating with a cavity in the heat pipe for holding the medium, said entry hole having a rim with a uniform, substantially sharp edge;

wherein the wall portion also has a threaded hole aligned with and communicating with the entry hole, said threaded hole having a substantially flat bottom;

a metal plug for engaging the rim and closing the entry hole; and a screw for insertion into the threaded hole, said screw being in substantially rigid driving relationship with said plug and being rotatable for advance to urge the plug into engagement with the edge of the rim, the plug having a surface that deforms around the rim to form a gas-tight, single use, metal-to-metal seal, to seal the entry hole.

2. The apparatus of claim 1, wherein the screw has at least one longitudinal vent communicating from one end of the screw to an opposite end.

3. The apparatus of claim 1, wherein the screw has a socket for receiving a tool head for rotating the screw.

4. The apparatus of claim 1, wherein the plug is a ball having a diameter approximately 1.5 times the diameter of the entry hole.

5. The apparatus of claim 1, wherein the plug forms a seal line deformation in the plug surface that has a width from approximately 10 mils to approximately 60 mils.

6. The apparatus of claim 1, wherein the plug is made of brass, copper or nickel.

7. The apparatus of claim 1, wherein the plug is a ball.

8. The apparatus of claim 7, further comprising a body of grease for holding the ball in a centered position and preventing rotation of the ball as it is urged into the entry hole by advance of the screw.

9.The apparatus of claim 7, further comprising a ring for disposition in the depth of the threaded hole for centering the ball on the entry hole.

10. The apparatus of claim 7, wherein the screw has a depression in one end for receiving and centering the ball along a screw axis aligned with a center of the entry hole.

11. The apparatus of claim 7, wherein the ball is made of brass, copper or nickel.

12. A method of sealing a port of a heat pipe for a roller, the method comprising:

placing a plug against one end of a screw such that the plug is held centered along a longitudinal axis of the screw;

placing the plug and screw in a threaded hole leading to an entry hole into a heat pipe cavity;

advancing the screw until the plug bottoms in the threaded hole and enters the entry hole, while drawing a vacuum through the screw; and advancing the screw an additional amount to lodge the plug in the hole and to seal the hole and the heat pipe cavity from the outside environment.

13. The method of claim 12, wherein the plug forms a seal line in the plug surface that has a width from approximately 10 mils to approximately 60 mils.

14. The method of claim 12, wherein the additional amount the screw is advanced is from approximately ¼ turn to approximately ¾ turn.

15. The method of claim 12, further comprising capping the threaded hole to prevent disturbance of the screw.

16. The method of claim 12, wherein the plug is a metal ball.

17. The method of claim 12, wherein the metal plug is removed and replaced with a new metal plug to reseal the port.

18. The method of claim 12, wherein the force applied to the metal plug by the screw, which deforms the metal surface of the metal plug is at least 400 pounds.

19. The method of claim 12, further comprising applying a lubricant, such as grease, between the metal plug and the screw to prevent rotation of the plug as the seal is being formed.

20. The method of claim 12, wherein the seal is formed to withstand temperatures up to at least 500° F.

* * * * *